(12) United States Patent
Tanada (10) Patent No.: US 9,272,579 B2
(45) Date of Patent: Mar. 1, 2016

(54) HEAVY DUTY PNEUMATIC TIRE

(75) Inventor: Kenichiro Tanada, Kobe (JP)

(73) Assignee: SUMITOMO RUBBER INDUSTRIES, LTD., Kobe-Shi (JP)

( * ) Notice: Subject to any disclaimer, the term of this patent is extended or adjusted under 35 U.S.C. 154(b) by 848 days.

(21) Appl. No.: 13/530,371

(22) Filed: Jun. 22, 2012

(65) Prior Publication Data

US 2013/0048172 A1    Feb. 28, 2013

(30) Foreign Application Priority Data

Aug. 23, 2011    (JP) .................. 2011-181069

(51) Int. Cl.
*B60C 9/28*    (2006.01)
*B60C 11/01*    (2006.01)

(52) U.S. Cl.
CPC .. *B60C 11/01* (2013.01); *B60C 9/28* (2013.01)

(58) Field of Classification Search
CPC .................................. B60C 11/01; B60C 9/28
See application file for complete search history.

(56) References Cited

U.S. PATENT DOCUMENTS

| 4,480,671 | A | 11/1984 | Giron | |
|---|---|---|---|---|
| 2004/0112493 | A1* | 6/2004 | Warchol et al. | 152/209.16 |
| 2005/0000613 | A1* | 1/2005 | Maruoka et al. | 152/209.1 |
| 2005/0006016 | A1 | 1/2005 | Ooyama | |
| 2006/0090826 | A1 | 5/2006 | Merino Lopez | |
| 2010/0116390 | A1* | 5/2010 | Sevart et al. | 152/209.14 |
| 2010/0269967 | A1 | 10/2010 | Maruoka | |

FOREIGN PATENT DOCUMENTS

| JP | 3-253408 A | 11/1991 |
|---|---|---|
| JP | 2003-341305 A | 12/2003 |
| JP | 2010-254246 A | 11/2010 |

* cited by examiner

*Primary Examiner* — Steven D Maki
(74) *Attorney, Agent, or Firm* — Birch, Stewart, Kolasch & Birch, LLP (57) ABSTRACT

In a tire 2, a body 24 and side ends 26 are formed by side grooves 22 being formed in edge PT portions of a tread 4. A ratio of a width BW of a belt 12 to a width TW of the body 24 is 0.95-1.00. A width GW of each side groove 22 is greater than or equal to 2.0 mm. A width RW of each side end 26 is greater than or equal to 2.0 mm. A ratio of a depth D1 of each side groove 22 to a depth D of each main groove 30a is 0.6-1.0. A ratio of a distance H from a vertex PP of each side end 26 to the tread surface 28 relative to the depth D is greater than or equal to 0.4.

2 Claims, 4 Drawing Sheets

HEAVY DUTY PNEUMATIC TIRE

This application claims priority on Patent Application No. 2011-181069 filed in JAPAN on Aug. 23, 2011. The entire contents of this Japanese Patent Application are hereby incorporated by reference.

BACKGROUND OF THE INVENTION

1. Field of the Invention

The present invention relates to heavy duty pneumatic tires.

2. Description of the Related Art

A tread of a tire includes a tread surface. The tread surface can contact with a road surface. The tread is formed of a crosslinked rubber.

In a heavy duty pneumatic tire mounted to a truck, a bus, and the like, a plurality of grooves are typically formed, in a tread, so as to extend in the circumferential direction, so that a plurality of ribs are formed. Among these ribs, ribs formed in outermost portions in the axial direction are referred to as shoulder ribs, and there is a problem that uneven wear is likely to occur in the shoulder ribs. This tendency is significant particularly in a tire mounted to a steered wheel of a vehicle. Various measures for addressing the uneven wear of a tread are suggested. The exemplary measures are disclosed in U.S. Pat. No. 4,480,671, JP2003-341305, JP03-011921 (U.S. Pat. No. 4,480,671), JP2005-028947 (US2005/0006016), JP03-253408, and JP2006-527686 (US2006/0090826).

The thickness of the shoulder rib may be gradually reduced from the inner side toward the outer side in the axial direction due to wear. The wear that causes such a state is referred to as shoulder wear. In order to address the shoulder wear, a review has been made such that a shape in which a tire contacts with the ground is adjusted by adjustment of a length over which the shoulder rib contacts with the ground.

In a tread having shoulder ribs that contact with the ground over a great length, load is concentrated on end portions located in outermost portions of the shoulder ribs in the axial direction, and an abnormally high ground contact pressure may be applied to the end portions. When the shoulder ribs are released from the ground contacting state due to rotation of the tire, the end portions slide on a road surface. In this case, the ends of the shoulder ribs rub, so that a stepped portion may be formed in the end portion. The wear that causes generation of the stepped portion in the end portion of the shoulder rib is referred to as step wear.

Through the review of a shape in which a tire contacts with the ground, generation of the shoulder wear has been restrained. However, another problem of the step wear arises anew. Consequently, generation of uneven wear has not been sufficiently restrained.

An object of the present invention is to make available a heavy duty pneumatic tire that restrains generation of uneven wear.

SUMMARY OF THE INVENTION

A heavy duty pneumatic tire of the present invention includes: a tread formed of a crosslinked rubber; and a belt that is located inwardly of the tread in a radial direction, and that extends in an axial direction. A body having an outer surface that forms a tread surface, and side ends located outwardly of the body in the axial direction are formed by side grooves extending in a circumferential direction being formed in end portions of the tread. Shoulder portions are formed in end portions of the body by main grooves extending in the circumferential direction being formed in the body. A vertex of each side end is located inwardly of the tread surface in the radial direction. A ratio of a width BW of the belt to a width TW of the body is greater than or equal to 0.95, and is not greater than 1.00. A width GW of each side groove is greater than or equal to 2.0 mm. A width RW of each side end is greater than or equal to 2.0 mm. A sum of the width GW of each side groove and the width RW of each side end is less than or equal to 10 mm. A ratio of a depth D1 of each side groove to a depth D of each main groove is greater than or equal to 0.6, and is not greater than 1.0. A ratio of a distance H from the vertex of each side end to the tread surface relative to the depth D of each main groove is greater than or equal to 0.4. When a ground contact surface of each shoulder portion, which is obtained when the tire contacts with a ground, is divided into an outer ground contact surface and an inner ground contact surface located inwardly of the outer ground contact surface in the axial direction, by a virtual boundary that extends in the circumferential direction, and that passes through a center of a maximal width of the ground contact surface, a ratio of an average ground contact pressure Po of the outer ground contact surface relative to an average ground contact pressure Pi of the inner ground contact surface is greater than or equal to 0.90, and is not greater than 1.00.

Preferably, in the heavy duty pneumatic tire, a ratio of the distance H to the depth D1 is greater than or equal to 0.4, and is not greater than 0.9.

DESCRIPTION OF THE PREFERRED EMBODIMENTS

The following will describe in detail the present invention based on preferred embodiments with reference to the accompanying drawing.

Figure 1:
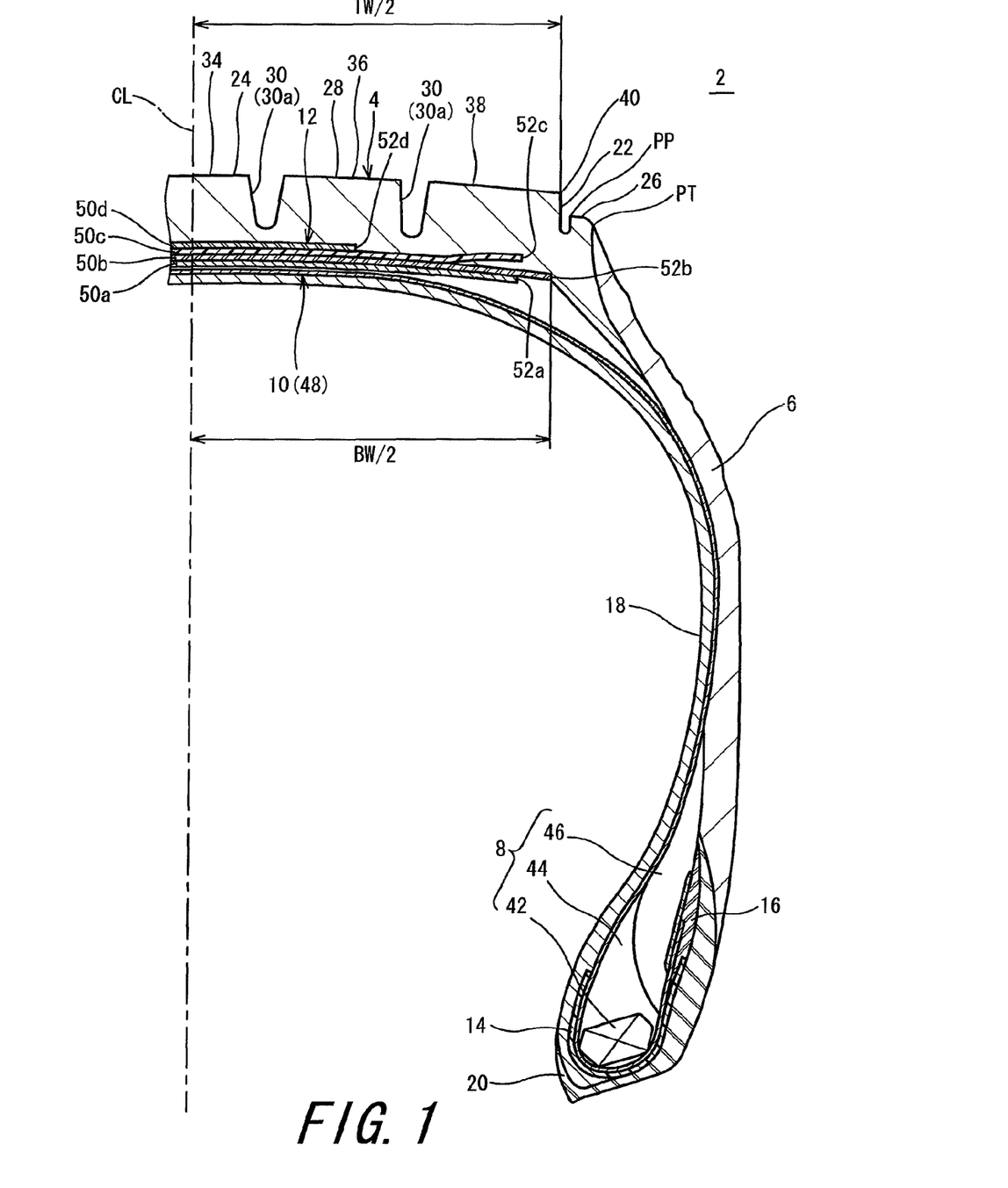
FIG. 1 is a cross-sectional view of a portion of a heavy duty pneumatic tire according to an embodiment of the present invention.

A tire 2 shown in FIG. 1 includes a tread 4, sidewalls 6, beads 8, a carcass 10, a belt 12, reinforcing layers 14, cover rubbers 16, an inner liner 18, and chafers 20. The tire 2 is of a tubeless type. The tire 2 is mounted to trucks, buses, and the like.

In FIG. 1, the upward/downward direction represents the radial direction, the leftward/rightward direction represents the axial direction, and the direction orthogonal to the surface of the sheet represents the circumferential direction. The tire 2 has a shape which is almost bilaterally symmetric about an alternate long and short dash line CL shown in FIG. 1. The alternate long and short dash line CL represents the equator plane of the tire 2. In FIG. 1, reference numeral PT represents an edge of the tread 4. The edge PT represents a boundary between the tread 4 and each of the sidewalls 6.

The tread 4 is formed of a crosslinked rubber excellent in wear resistance. The tread 4 has a shape projecting outward in the radial direction.

In the tire 2, the tread 4 has side grooves 22 in portions of each edge PT. The side grooves 22 extend in the circumferential direction. In the tire 2, the side grooves 22 are formed in the portions of each edge PT of the tread 4, so that a body 24 and side ends 26 are formed. In the tire 2, the side grooves 22 are formed in the portions of both of the edges PT, respectively, of the tread 4, which is not shown. Therefore, the side grooves 22 are formed in the portions of both of the edges PT, respectively, of the tread 4, so that the body 24 and a pair of the side ends 26 are formed. In other words, the tread 4 includes the body 24, a pair of the side ends 26, and a pair of the side grooves 22. Each side end 26 is located outwardly of the body 24 in the axial direction.

In FIG. 1, reference numeral PP represents an edge of each side end 26, which is located on the innermost side of the side end 26 in the axial direction. As shown in the drawings, the outer surface of each side end 26 extends outward from the edge PP in the axial direction so as to be tilted inward in the radial direction. The edge PP is a vertex of each side end 26.

The body 24 has a tread surface 28. In other words, the outer surface of the body 24 forms the tread surface 28. The tread surface 28 can contact with a road surface. The tread surface 28 has grooves 30 formed therein. A tread pattern is formed due to the grooves 30.

Figure 2:
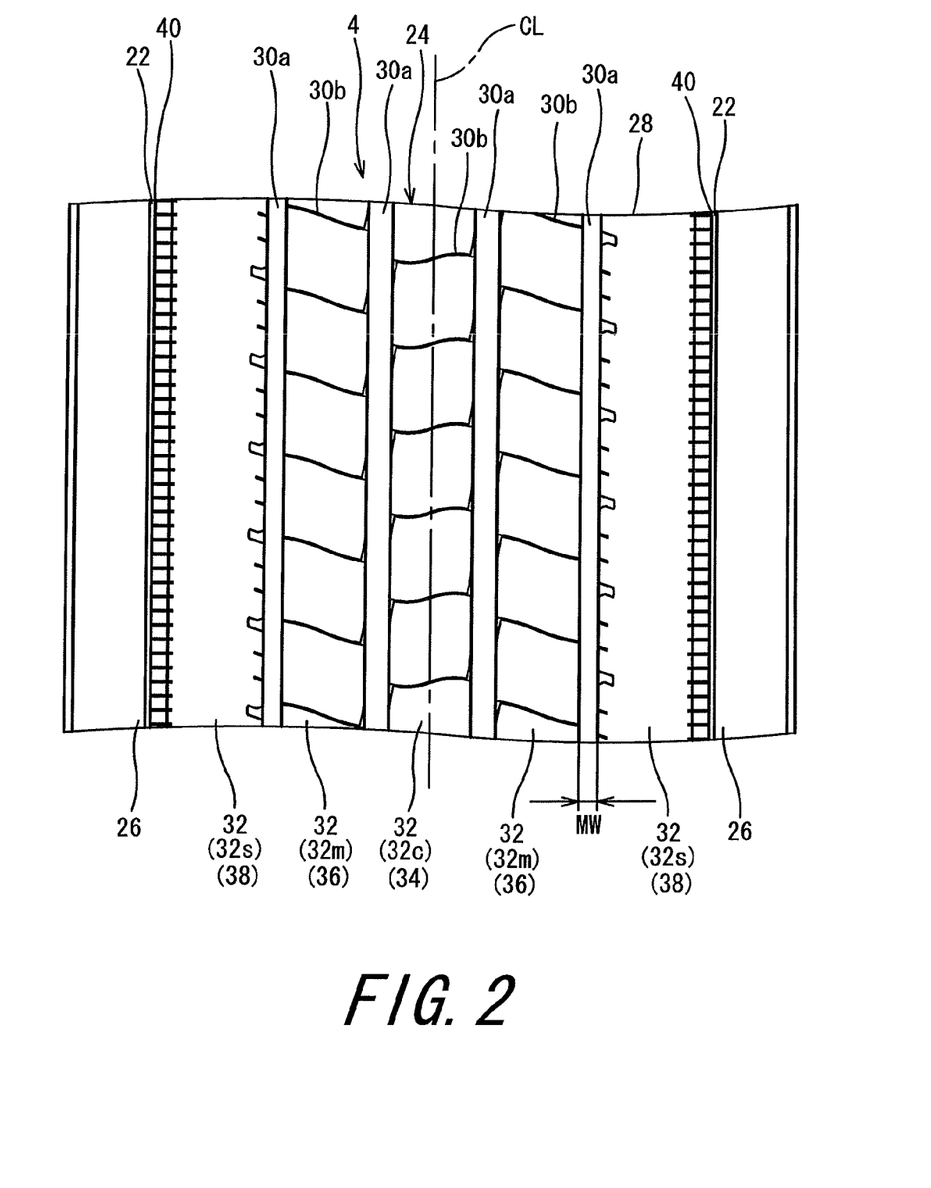
FIG. 2 is a development of a portion of a tread pattern of the tire shown in FIG. 1.

FIG. 2 is a development of the tread pattern of the tire 2. In FIG. 2, the upward/downward direction represents the circumferential direction, the leftward/rightward direction represents the axial direction, and the direction orthogonal to the surface of the sheet represents the radial direction.

In the tread surface 28 of the tire 2, main grooves 30*a* and narrow grooves 30*b* are formed. The main grooves 30*a* extend in the circumferential direction. In FIG. 2, reference numeral MW represents the width of each main groove 30*a*. In the tire 2, the width MW of each main groove 30*a* is greater than or equal to 5.0 mm, and is not greater than 15.0 mm. As shown in the drawings, the number of the main grooves 30*a* formed in the tire 2 is four. All the main grooves 30*a* have almost the same depth and width. In the tire 2, the main grooves 30*a* are formed in the body 24, so that five ribs 32 are formed so as to extend in the circumferential direction. In the present embodiment described herein, a rib located on the tire equator, among the ribs 32, is represented as a rib 32*c*, and is referred to as a center potion 34. A pair of ribs 32*m* is formed such that each rib 32*m* is located outwardly of the center portion 34 in the axial direction, and the ribs 32*m* are referred to as middle portions 36. A pair of ribs 32*s* is formed such that each rib 32*s* is located outwardly of a corresponding one of the middle portions 36 in the axial direction, and the ribs 32*s* are referred to as shoulder portions 38. In the tire 2, four main grooves 30*a* are formed in the body 24. Therefore, the center portion 34 is formed on the tire equator, the shoulder portions 38 are formed in portions of ends 40, respectively, of the body 24, and each middle portion 36 is formed between the center portion 34 and a corresponding one of the shoulder portions 38.

The narrow grooves 30*b* extend in almost the axial direction. The width of each narrow groove 30*b* is extremely small. The narrow grooves 30*b* enable the ribs 32 to be flexible. The narrow grooves 30*b* may be referred to as sipes. As shown in the drawings, in the tire 2, each of the center portion 34 and the middle portions 36 has multiple narrow grooves 30*b* formed therein. The narrow grooves 30*b* are formed so as to be spaced from each other at predetermined intervals in the circumferential direction.

In the tire 2, the body 24 of the tread 4 may have formed therein a plurality of the main grooves 30*a* that extend in the circumferential direction, and multiple sub-grooves each of which extends in the axial direction, and has almost the same width and depth as each main groove 30*a*, thereby dividing the body 24 into multiple blocks. In this case, among the multiple blocks forming the body 24, a collection of blocks that are located in the portion of each end 40 of the body 24, and that are aligned in the circumferential direction in a continuous manner, corresponds to the shoulder portion 38. Also in the case, the shoulder portions 38 are formed in the portions of the ends 40 of the body 24 by the main grooves 30*a* being formed in the body 24. The width of each sub-groove is preferably greater than or equal to 8 mm, and is not greater than 12 mm.

As shown in FIG. 1, the sidewalls 6 extend from the edges PT, respectively, of the tread 4 approximately inwardly in the radial direction. The sidewalls 6 are formed of a crosslinked rubber. The sidewalls 6 flexibly bend. The sidewalls 6 absorb impact from a road surface. Further, the sidewalls 6 prevent injury of the carcass 10.

The beads 8 each include a core 42, an apex 44 extending from the core 42 outward in the radial direction, and a packing rubber 46 extending from the apex 44 outward in the radial direction. The core 42 is formed so as to be ring-shaped. The core 42 is formed of a plurality of non-stretchable wires (steel wires are typically used). The apex 44 is tapered outward in the radial direction. The apex 44 is formed of a highly hard crosslinked rubber. The packing rubber 46 is tapered outward in the radial direction. The packing rubber 46 is flexible. The packing rubber 46 reduces concentration of a stress on the end of the carcass 10.

The carcass 10 includes a carcass ply 48. The carcass ply 48 extends on and between the beads 8 located on both sides. The carcass ply 48 extends under and along the tread 4 and the sidewalls 6. The carcass ply 48 is turned up around each core 42 from the inner side to the outer side in the axial direction.

The carcass ply 48 is formed of multiple cords aligned with each other, and a topping rubber, which is not shown. An absolute value of an angle of each cord relative to the equator plane usually ranges from 70 degrees to 90 degrees. In other words, the carcass 10 forms a radial structure. The cords are formed of a steel.

The belt 12 extends in the axial direction. The belt 12 is located inwardly of the tread 4 in the radial direction. The belt 12 is located outwardly of the carcass 10 in the radial direction. The belt 12 is layered over the carcass 10. The belt 12 reinforces the carcass 10. In the tire 2, the belt 12 includes a first layer 50*a*, a second layer 50*b*, a third layer 50*c*, and a fourth layer 50*d*. Each of the first layer 50*a*, the second layer 50*b*, the third layer 50*c*, and the fourth layer 50*d* includes multiple cords aligned with each other and a topping rubber, which is not shown. Each cord is formed of a steel. Each cord is tilted relative to the equator plane. An absolute value of an angle of each cord to the equator plane ranges from 15 degrees to 70 degrees.

As shown in the drawings, ends 52*b* of the second layer 50*b* are located outwardly of ends 52*a*, respectively, of the first layer 50*a* in the axial direction. The ends 52*b* of the second layer 50*b* are located outwardly of ends 52*c*, respectively, of the third layer 50*c* in the axial direction. The ends 52*b* of the second layer 50*b* are located outwardly of ends 52*d*, respectively, of the fourth layer 50*d* in the axial direction. In the tire 2, among the first layer 50*a*, the second layer 50*b*, the third layer 50*c*, and the fourth layer 50*d* which form the belt 12, the second layer 50*b* has the greatest width. In the tire 2, the ends 52*b* of the second layer 50*b* correspond to ends, respectively, of the belt 12.

The reinforcing layers 14 are each turned around the core 42. The reinforcing layers 14 are layered over the carcass ply 48. Each reinforcing layer 14 includes multiple cords aligned with each other, and a topping rubber. Each cord is formed of a steel. Each reinforcing layer 14 is also referred to as a steel filler. The reinforcing layers 14 contribute to durability of the tire 2.

The cover rubbers 16 are each located outwardly of the packing rubber 46 in the axial direction. The cover rubbers 16 are layered over the carcass 10. The ends of the carcass ply 48 are covered with the cover rubbers 16, respectively. The cover rubbers 16 reduce concentration of a stress on the ends of the carcass ply 48. One end of each reinforcing layer 14 is also covered with the cover rubber 16. The cover rubbers 16 reduce concentration of a stress on the one end of each reinforcing layer 14.

The chafers 20 are located near the beads 8, respectively. The chafers 20 extend inwardly of the sidewalls 6, respectively, in the radial direction. When the tire 2 is incorporated into a rim (not shown), the chafers 20 abut against the rim. Regions near the beads 8 are protected due to the abutment. The chafers 20 are typically formed of a fabric and a rubber impregnated into the fabric. The chafers 20 may be formed of only a rubber.

The inner liner 18 is bonded to the inner circumferential surface of the carcass 10. The inner liner 18 extends outwardly from each chafer 20 in the radial direction. The inner liner 18 extends between the chafers 20 on the right side and the left side. The inner liner 18 is formed of a crosslinked rubber. A rubber excellent in air blocking property is used for the inner liner 18. The inner liner 18 acts so as to maintain an internal pressure of the tire 2.

As shown in the drawings, in the tire 2, each end 52b of the belt 12 is located near the end 40 of the body 24 of the tread 4 in the axial direction. Thus, the belt 12 can effectively contribute to stiffness of the shoulder portions 38. The entirety of the shoulder portions 38 has an appropriate stiffness. Therefore, a ground contact pressure is uniform in any portion of the shoulder portions 38 when the shoulder portions 38 contact with a road surface. In the tire 2, the shoulder portions 38 do not include portions indicating a specific ground contact pressure. In the shoulder portions 38, a ground contact pressure distribution is uniform. In the tire 2, generation of shoulder wear and step wear is restrained. The tire 2 can effectively restrain generation of uneven wear.

In FIG. 1, a double-headed arrow TW/2 represents half the width of the body 24 of the tread 4 in the axial direction. The width TW/2 represents a distance from the equator plane to the end 40 of the body 24 in the axial direction. A double-headed arrow BW/2 represents half the width of the belt 12 in the axial direction. The width BW/2 represents a distance from the equator plane to the end 52b of the belt 12 in the axial direction.

In the tire 2, a ratio of the width BW/2 to the width TW/2, that is, a ratio of the width BW of the belt 12 to the width TW of the body 24 is greater than or equal to 0.95, and is not greater than 1.00. When the ratio is set to be greater than or equal to 0.95, the belt 12 can effectively contribute to stiffness of the shoulder portions 38. Since the entirety of the shoulder portions 38 has an appropriate stiffness, a ground contact pressure is uniform in any portion of the shoulder portions 38 when the shoulder portions 38 contact with a road surface. In the tire 2, the shoulder portions 38 do not include portions indicating a specific ground contact pressure. In the shoulder portions 38, a ground contact pressure distribution is uniform. Therefore, in the tire 2, generation of shoulder wear and step wear is restrained. The tire 2 can effectively restrain generation of uneven wear. When the ratio is set to be not greater than 1.00, the belt 12 having the ends 52b located at appropriate positions can be obtained. The tire 2 having the belt 12 is excellent in durability.

In the tread 4 under a load, a force is conveyed from the portions of the sidewalls 6 to portions of each edge PT of the tread 4. As described above, in the tire 2, the side grooves 22 are formed in the portions of each edge PT of the tread 4, thereby forming the side ends 26. Thus, in the tire 2, in the ends 40 of the body 24 of the tread 4, that is, in the ends 40 of the shoulder portions 38 of the body 24, increase of a ground contact pressure is restrained. In particular, the side grooves 22 act to reduce the force conveyed from the portions of the sidewalls 6. In the tire 2, a ground contact pressure distribution is uniform in the shoulder portions 38. In the tire 2, generation of shoulder wear and step wear is restrained. The tire 2 can effectively restrain generation of uneven wear.

Figure 3:
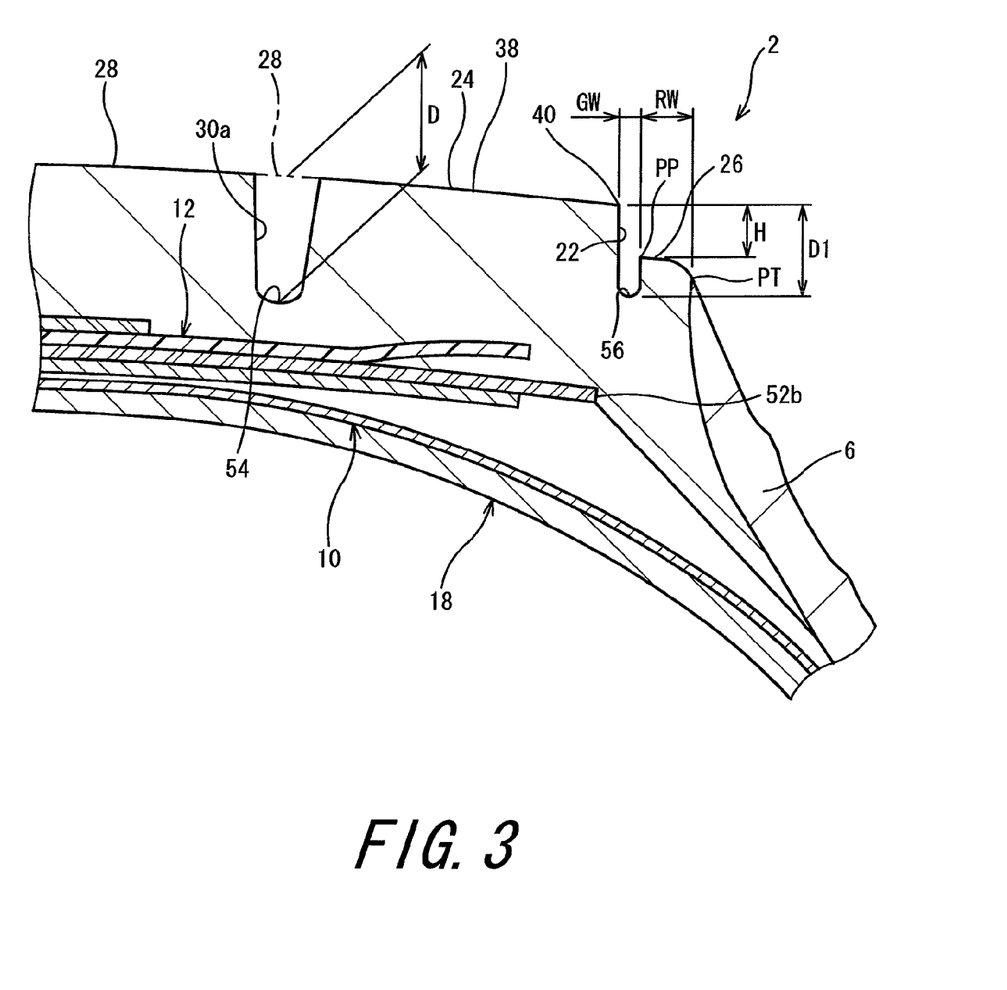
FIG. 3 is an enlarged cross-sectional view of a portion of the tire shown in FIG. 1.

FIG. 3 shows a portion of the tire 2 shown in FIG. 1. FIG. 3 shows a region of the shoulder portion 38 of the tire 2. A double-headed arrow GW represents the width of each side groove 22. The width GW is represented as a distance from the end 40 of the body 24 to the edge PP of the side end 26 in the axial direction. A double-headed arrow RW represents the width of each side end 26. The width RW is represented as a distance from the edge PP of the side end 26 to the edge PT of the tread 4 in the axial direction.

In the tire 2, the width GW is greater than or equal to 2.0 mm. When the width GW is set to be greater than or equal to 2.0 mm, the side grooves 22 are prevented from being deformed by the side ends 26 and the body 24 contacting with each other due to the force conveyed from the portions of the sidewalls 6. The side grooves 22 can effectively absorb the force conveyed from the portions of the sidewalls 6. In the tire 2, increase of a ground contact pressure is restrained in the ends 40 of the shoulder portions 38. In the tire 2, generation of shoulder wear and step wear is restrained. In the tire 2, generation of uneven wear can be effectively restrained. In this viewpoint, the width GW is more preferably greater than or equal to 2.5 mm. From the viewpoint of appropriately maintaining the width TW of the body 24, the width GW is preferably not greater than 8 mm.

In the tire 2, the width RW is greater than or equal to 2.0 mm. When the width RW is set to be greater than or equal to 2.0 mm, the side ends 26 have an appropriate strength. Thus, splitting of the side end 26 which is caused when the side end 26 contacts with a road surface can be prevented. In this viewpoint, the width RW is more preferably greater than or equal to 2.5 mm. From the viewpoint of appropriately maintaining the width TW of the body 24, the width RW is preferably not greater than 8 mm.

In the tire 2, a sum (GW+RW) of the width GW and the width RW is less than or equal to 10 mm. Thus, the width TW of the body 24 of the tread 4 can be appropriately maintained. In the tire 2, wear of the body 24 can be effectively restrained. The tire 2 is excellent in durability. In this viewpoint, the sum (GW+RW) is preferably not greater than 8 mm. As described above, the width GW is greater than or equal to 2.0 mm, and the width RW is greater than or equal to 2.0 mm. Therefore, the sum (GW+RW) is greater than or equal to 4.0 mm.

In FIG. 3, a double-headed arrow D represents a depth of each main groove 30a. The depth D is represented as a length to a bottom 54 of the main groove 30a from the tread surface 28 which is obtained on the assumption that the main groove 30a is not formed. A double-headed arrow D1 represents a depth of each side groove 22. The depth D1 is represented as a height, in the radial direction, to a bottom 56 of each side groove 22, from the end 40 of the body 24, that is, the end 40 of the tread surface 28. A double-headed arrow H represents a distance from the vertex PP of the side end 26 to the end 40 of the tread surface 28 in the radial direction. The distance H is also referred to a step-down amount.

In the tire 2, each side groove 22 has the depth D1 that is equal to the depth D of each main groove 30a or is less than the depth D of each main groove 30a. The side grooves 22 having the depth D1 described above can effectively absorb the force conveyed from the portions of the sidewalls 6. In the tire 2, increase of a ground contact pressure at the ends 40 of the shoulder portions 38 can be restrained. In the tire 2, generation of shoulder wear and step wear is restrained. In the tire 2, generation of uneven wear can be effectively restrained.

In the tire 2, a ratio of the depth D1 to the depth D is greater than or equal to 0.6, and is not greater than 1.0. When the ratio is set to be greater than or equal to 0.6, the side ends 26 can effectively absorb the force conveyed from the portions of the sidewalls 6. In the tire 2, increase of a ground contact pressure at the ends 40 of the shoulder portions 38 is restrained. In the tire 2, generation of shoulder wear and step wear is restrained. In the tire 2, generation of uneven wear can be effectively restrained. In this viewpoint, the ratio is more preferably greater than or equal to 0.7. When the ratio is set to be not greater than 1.0, the ends 52b of the belt 12 and the bottom 56 of each side groove 22 are prevented from being close to each other. In the tire 2, an influence of the side grooves 22 on durability is restrained. The tire 2 is excellent in durability. In this viewpoint, the ratio is preferably not greater than 0.9.

In the tire 2, the vertex PP of each side end 26 is located inwardly of the end 40 of the body 24, that is, the end 40 of the tread surface 28, in the radial direction. In the tire 2, a ratio of the distance H to the depth D1 is less than 1.0. Thus, contact between the side ends 26 and a road surface is prevented. Splitting of the side ends 26 due to this contact does not occur, that is, the side ends 26 remain formed without splitting. Therefore, in the tire 2, increase of a ground contact pressure at the ends 40 of the shoulder portions 38 is restrained. In the tire 2, generation of shoulder wear and step wear is restrained. In the tire 2, generation of uneven wear can be effectively restrained. In this viewpoint, the ratio of the distance H to the depth D1 is more preferably greater than or equal to 0.4, and is more preferably not greater than 0.9.

In the tire 2, a ratio of the distance H to the depth D is greater than or equal to 0.4, and is less than 1. When the ratio is set to be greater than or equal to 0.4, contact between the side ends 26 and a road surface can be effectively prevented. Splitting of the side ends 26 due to the contact does not occur, that is, the side ends 26 remain formed without splitting. Therefore, in the tire 2, increase of a ground contact pressure at the ends 40 of the shoulder portions 38 is restrained. In the tire 2, generation of shoulder wear and step wear can be restrained. In the tire 2, generation of uneven wear can be effectively restrained. When the ratio is set to be less than 1, the side ends 26 and the side grooves 22 enable increase of a ground contact pressure at the ends 40 of the shoulder portions 38 to be effectively restrained. In the tire 2, generation of shoulder wear and step wear can be restrained. In the tire 2, generation of uneven wear can be effectively restrained. In this viewpoint, the ratio is more preferably not greater than 0.9.

Figure 4:
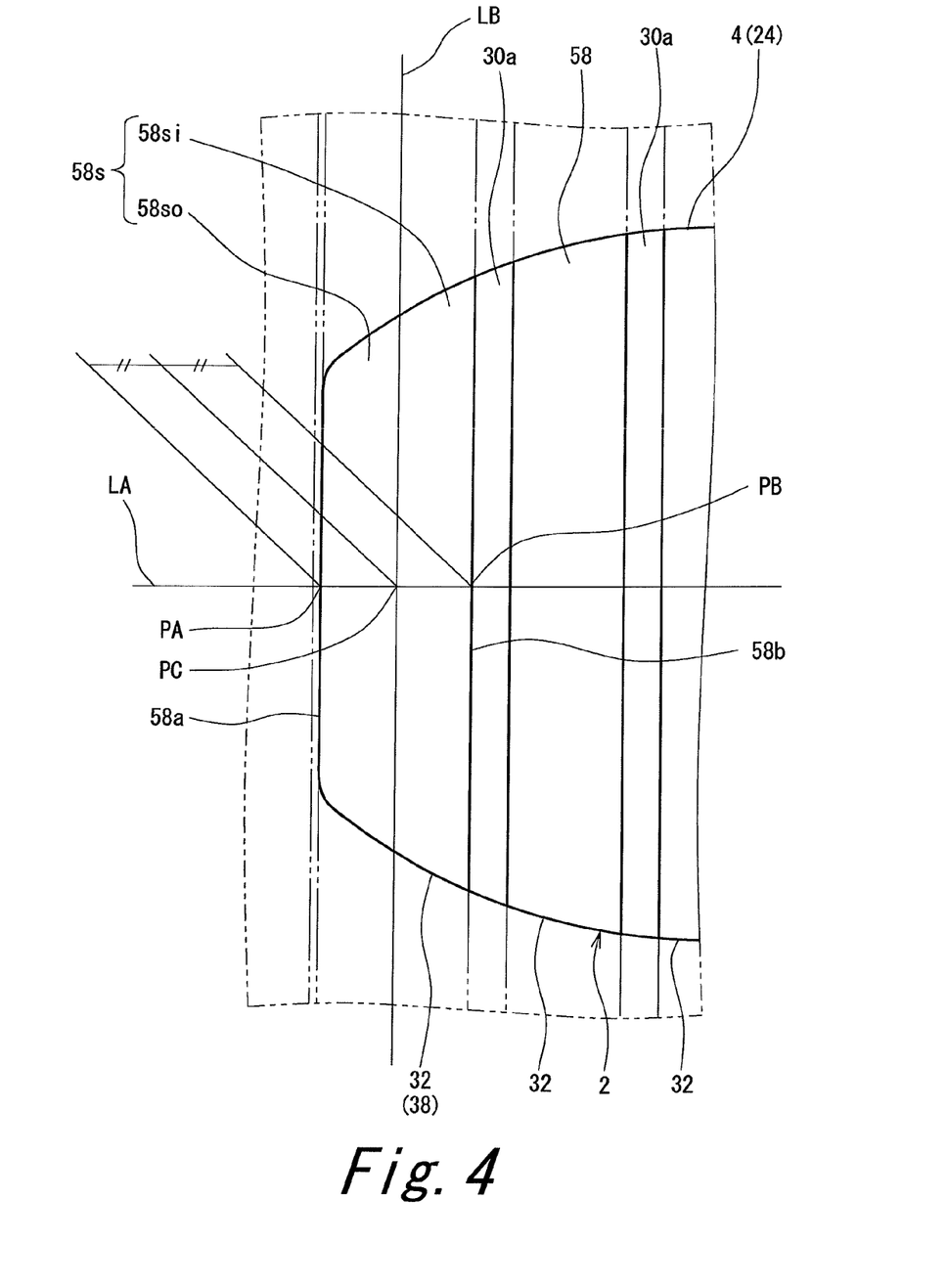
FIG. 4 is a schematic diagram illustrating a state in which the tire shown in FIG. 1 contacts with a road surface.

FIG. 4 shows a portion of a ground contact surface 58 of the body 24 of the tread 4, which is obtained when the tire 2 contacts with the ground. In FIG. 4, the narrow grooves 30b formed on the ribs 32 are not shown. The ground-contacting state can be obtained by using, for example, a pressure distribution measuring device available from Tekscan, Inc. The pressure distribution measuring device can monitor the ground contact surface 58 of the tire 2 and measure a ground contact pressure. A ground contact pressure of each portion of the ground contact surface 58 is measured at intervals of 1.5 mm by this device. For the measurement, a load is set as 31.87 kN, and an air pressure of the tire 2 is set as 800 kPa.

In FIG. 4, a solid line LA represents a position at which the width of a ground contact surface 58s of the shoulder portion 38 in the axial direction is maximal. Reference numeral PA represents a point of intersection between the solid line LA and an outermost end 58a of the shoulder portion 38 on the ground contact surface 58s. Reference numeral PB represents a point of intersection between the solid line LA and an innermost end 58b of the shoulder portion 38 on the ground contact surface 58s. Reference numeral PC represents the center of the maximal width of the ground contact surface 58s of the shoulder portion 38. A solid line LB represents a straight line that passes through the center PC and extends along the circumferential direction. The solid line LB represents the center line of the ground contact surface 58s of the shoulder portion 38. The center line LB is orthogonal to the solid line LA. In the present embodiment describe herein, a portion 58so that is included in the ground contact surface 58s of the shoulder portion 38 and is located outwardly of the center line LB in the axial direction, is referred to as an outer ground contact surface. A portion 58si that is included in the ground contact surface 58s of the shoulder portion 38, and is located inwardly of the center line LB in the axial direction, is referred to as an inner ground contact surface. The inner ground contact surface 58si is located inwardly of the outer ground contact surface 58so in the axial direction. The center line LB is a virtual boundary between the outer ground contact surface 58so and the inner ground contact surface 58si.

In the tire 2, in a case where the ground contact surface 58s of the shoulder portion 38 is divided into the outer ground contact surface 58so and the inner ground contact surface 58si by the virtual boundary LB, a ratio of an average ground contact pressure Po of the outer ground contact surface 58so relative to an average ground contact pressure Pi of the inner ground contact surface 58si indicates a value that is greater than or equal to 0.90, and is not greater than 1.00. In the tire 2, a difference between the average ground contact pressure Pi of the inner ground contact surface 58si and the average ground contact pressure Po of the outer ground contact surface 58so at the shoulder portion 38 is small. In the shoulder portion 38, a ground contact pressure distribution is uniform. In the shoulder portions 38 for which the ratio is set to be greater than or equal to 0.90, the portions of the ends 40 have an appropriate ground contact pressure. In the tire 2, generation of shoulder wear is restrained. In the shoulder portions 38 for which the ratio is set to be not greater than 1.00, a ground contact pressure in the portions of the ends 40 is appropriately maintained. In the tire 2, generation of step wear is restrained. Therefore, in the tire 2 in which the ratio is set to be greater than or equal to 0.90, and be not greater than 1.00, generation of uneven wear is restrained. The average ground contact pressure Pi of the inner ground contact surface 58si represents an average value of all the ground contact pressures obtained by measuring ground contact pressures for each portion of the inner ground contact surface 58si at intervals of 1.5 mm. The average ground contact pressure Po of the outer ground contact surface 58so represents an average value of all the ground contact pressures obtained by measuring ground contact pressures for each portion of the outer ground contact surface 58so at intervals of 1.5 mm.

In the present invention, the dimensions and angles of the components of the tire 2 are measured in a state where the tire 2 is incorporated into a normal rim, and the tire 2 is filled with air so as to obtain a normal internal pressure. During the measurement, no load is applied to the tire 2. In the description of the present invention, the normal rim represents a rim which is specified according to the standard with which the tire 2 complies. The "standard rim" in the JATMA standard, the "Design Rim" in the TRA standard, and the "Measuring Rim" in the ETRTO standard are included in the normal rim. In the description of the present invention, the normal internal pressure represents an internal pressure which is specified according to the standard with which the tire 2 complies. The "maximum air pressure" in the JATMA standard, the "maximum value" recited in "TIRE LOAD LIMITS AT VARIOUS COLD INFLATION PRESSURES" in the TRA standard, and the "INFLATION PRESSURE" in the ETRTO standard are included in the normal internal pressure. In the case of the tire 2 for use in passenger cars, the dimensions and angles are measured in a state where the internal pressure is 180 kPa.

EXAMPLES

Hereinafter, effects of the present invention will become apparent according to examples. However, the present invention should not be restrictively construed based on the description of examples.

Example 1

A heavy duty pneumatic tire of example 1 having a fundamental structure shown in FIG. 1 and having specifications indicated below in table 1 was produced. The size of the tire was "12R22.5". In the tire, side grooves were formed in a tread, so that side ends were formed. This state is indicated as "A" in tables. A ratio (BW/TW) of the width BW of the belt to the width TW of a body of the tread was 0.98. The width GW of each side groove was 2.5 mm. The width RW of each side end was 4.5 mm. A sum (GW+RW) of the width GW of each side groove and the width RW of each side end was 7.0 mm. A ratio (D1/D) of the depth D1 of each side groove to the depth D of a main groove was 0.8. A ratio (H/D) of the distance H from the vertex of each side end to a tread surface relative to the depth D of the main groove was 0.5. A ratio (Po/Pi) of the ground contact pressure Po of an outer ground contact surface relative to the ground contact pressure Pi of an inner ground contact surface at the shoulder portion was 0.95.

Example 2 to 3 and Comparative Example 2 to 4

Tires of example 2 to 3 and comparative example 2 to 4 were each obtained in the same manner as in example 1 except that the ratio (BW/TW) and the ratio (Po/Pi) were as indicated below in table 1.

Example 4 to 12 and Comparative Example 5 to 9

Tires of example 4 to 12 and comparative example 5 to 9 were each obtained in the same manner as in example 1 except that the ratio (D1/D), the ratio (H/D), and the ratio (Po/Pi) were as indicated below in table 2 and table 3.

Example 13 to 14 and Comparative Example 10 to 11

Tires of example 13 to 14 and comparative example 10 to 11 were each obtained in the same manner as in example 1 except that the ratio (Po/Pi) was as indicated below in table 4.

Example 15 to 17 and Comparative Example 12 to 14

Tires of example 15 to 17 and comparative example 12 to 14 were each obtained in the same manner as in example 1 except that the width GW, the width RW, and the ratio (Po/Pi) were as indicated below in table 5.

Example 18 to 20 and Comparative Example 15 to 17

Tires of example 18 to 20 and comparative example 15 to 17 were each obtained in the same manner as in example 1 except that the width GW, the width RW, and the sum (GW+RW) were as indicated below in table 6.

Comparative Example 1

Comparative example 1 represented a conventional heavy duty pneumatic tire. The tread of the tire had no side grooves formed therein. Therefore, the tread had no side ends.

[Wear Resistance]

Each tire was incorporated into a rim of 8.25×22.5, and the tire was filled with air such that the internal pressure was 800 kPa. The tires were mounted to front wheels of a truck (10 tons), and the truck was caused to run on a circuit course at a speed of 60 km/h in a fully loaded state. The running of the truck was continued until an amount of wear reached a mass corresponding to 30% of an initial mass of each tire. After the running, the shoulder portions of the tires were visually observed, and generation of step wear, shoulder wear, and splitting of the side ends were checked for. The results are indicated below in table 1 to table 6. Generation states of the step wear and the shoulder wear are indicated on a scale of one to five, that is, on a five-point scale. A case in which no generation was observed is represented as "5". The greater the value is, the more favorable the result is. A case in which no splitting of the side end was observed is represented as "G", and a case in which splitting of the side end was observed is represented as "NG".

TABLE 1

| | Evaluation results | | | | | | |
|---|---|---|---|---|---|---|---|
| | Comp. example 1 | Comp. example 2 | Comp. example 3 | Example 2 | Example 1 | Example 3 | Comp. example 4 |
| Ratio BW/TW | 0.90 | 0.90 | 0.90 | 0.95 | 0.98 | 1.00 | 1.05 |
| Side end | B | A | A | A | A | A | A |
| Width GW of side groove [mm] | — | 2.5 | 2.5 | 2.5 | 2.5 | 2.5 | 2.5 |
| Width RW of side end [mm] | — | 4.5 | 4.5 | 4.5 | 4.5 | 4.5 | 4.5 |
| Sum (GW + RW) [mm] | — | 7.0 | 7.0 | 7.0 | 7.0 | 7.0 | 7.0 |
| Ratio D1/D | — | 0.8 | 0.8 | 0.8 | 0.8 | 0.8 | 0.8 |
| Ratio H/D | — | 0.5 | 0.5 | 0.5 | 0.5 | 0.5 | 0.5 |

TABLE 1-continued

| | Comp. example 1 | Comp. example 2 | Comp. example 3 | Example 2 | Example 1 | Example 3 | Comp. example 4 |
|---|---|---|---|---|---|---|---|
| | Evaluation results | | | | | | |
| Ratio H/D1 | — | 0.63 | 0.63 | 0.63 | 0.63 | 0.63 | 0.63 |
| Ratio Po/Pi | 0.91 | 0.90 | 0.95 | 0.95 | 0.95 | 0.95 | 0.95 |
| Step wear | 3 | 5 | 5 | 5 | 5 | 5 | 5 |
| Shoulder wear | 2 | 2 | 3 | 4 | 5 | 5 | 5 |
| Splitting of side end | G | G | G | G | G | G | G |

TABLE 2

| | Comp. example 5 | Comp. example 6 | Example 4 | Example 5 | Example 6 | Example 7 | Example 8 |
|---|---|---|---|---|---|---|---|
| | Evaluation results | | | | | | |
| Ratio BW/TW | 0.98 | 0.98 | 0.98 | 0.98 | 0.98 | 0.98 | 0.98 |
| Side end | A | A | A | A | A | A | A |
| Width GW of side groove [mm] | 2.5 | 2.5 | 2.5 | 2.5 | 2.5 | 2.5 | 2.5 |
| Width RW of side end [mm] | 4.5 | 4.5 | 4.5 | 4.5 | 4.5 | 4.5 | 4.5 |
| Sum (GW + RW) [mm] | 7.0 | 7.0 | 7.0 | 7.0 | 7.0 | 7.0 | 7.0 |
| Ratio D1/D | 0.5 | 0.5 | 0.6 | 0.6 | 0.7 | 0.9 | 1.0 |
| Ratio H/D | 0.4 | 0.4 | 0.4 | 0.5 | 0.5 | 0.5 | 0.5 |
| Ratio H/D1 | 0.80 | 0.80 | 0.80 | 0.83 | 0.71 | 0.56 | 0.50 |
| Ratio Po/Pi | 0.97 | 0.95 | 0.95 | 0.96 | 0.96 | 0.96 | 0.96 |
| Step wear | 3 | 3 | 4 | 4 | 4 | 5 | 5 |
| Shoulder wear | 5 | 4 | 5 | 5 | 5 | 5 | 5 |
| Splitting of side end | G | G | G | G | G | G | G |

TABLE 3

| | Comp. example 7 | Comp. example 8 | Comp. example 9 | Example 9 | Example 10 | Example 11 | Example 12 |
|---|---|---|---|---|---|---|---|
| | Evaluation results | | | | | | |
| Ratio BW/TW | 0.98 | 0.98 | 0.98 | 0.98 | 0.98 | 0.98 | 0.98 |
| Side end | A | A | A | A | A | A | A |
| Width GW of side groove [mm] | 2.5 | 2.5 | 2.5 | 2.5 | 2.5 | 2.5 | 2.5 |
| Width RW of side end [mm] | 4.5 | 4.5 | 4.5 | 4.5 | 4.5 | 4.5 | 4.5 |
| Sum (GW + RW) [mm] | 7.0 | 7.0 | 7.0 | 7.0 | 7.0 | 7.0 | 7.0 |
| Ratio D1/D | 1.1 | 1.0 | 0.8 | 0.8 | 1.0 | 0.8 | 0.8 |
| Ratio H/D | 0.5 | 0.1 | 0.3 | 0.4 | 0.4 | 0.6 | 0.7 |
| Ratio H/D1 | 0.45 | 0.10 | 0.38 | 0.50 | 0.40 | 0.75 | 0.88 |
| Ratio Po/Pi | 0.96 | 0.98 | 0.95 | 0.95 | 0.95 | 0.95 | 0.95 |
| Step wear | 5 | 2 | 3 | 5 | 5 | 5 | 5 |
| Shoulder wear | 5 | 5 | 5 | 5 | 5 | 5 | 5 |
| Splitting of side end | G | G | G | G | G | G | G |

TABLE 4

| | Comp. example 10 | Example 13 | Example 14 | Comp. example 11 |
|---|---|---|---|---|
| | Evaluation results | | | |
| Ratio BW/TW | 0.98 | 0.98 | 0.98 | 0.98 |
| Side end | A | A | A | A |
| Width GW of side groove [mm] | 2.5 | 2.5 | 2.5 | 2.5 |
| Width RW of side end [mm] | 4.5 | 4.5 | 4.5 | 4.5 |
| Sum (GW + RW) [mm] | 7.0 | 7.0 | 7.0 | 7.0 |
| Ratio D1/D | 0.8 | 0.8 | 0.8 | 0.8 |
| Ratio H/D | 0.5 | 0.5 | 0.5 | 0.5 |
| Ratio H/D1 | 0.63 | 0.63 | 0.63 | 0.63 |
| Ratio Po/Pi | 0.80 | 0.90 | 1.00 | 1.10 |
| Step wear | 5 | 5 | 4 | 1 |
| Shoulder wear | 1 | 4 | 5 | 5 |
| Splitting of side end | G | G | G | G |

TABLE 5

Evaluation results

|  | Comp. example 12 | Comp. example 13 | Example 15 | Example 16 | Example 17 | Comp. example 14 |
| --- | --- | --- | --- | --- | --- | --- |
| Ratio BW/TW | 0.98 | 0.98 | 0.98 | 0.98 | 0.98 | 0.98 |
| Side end | A | A | A | A | A | A |
| Width GW of side groove [mm] | 1.0 | 1.0 | 2.0 | 5.0 | 5.0 | 6.0 |
| Width RW of side end [mm] | 6.0 | 6.0 | 5.0 | 2.0 | 2.0 | 1.0 |
| Sum (GW + RW) [mm] | 7.0 | 7.0 | 7.0 | 7.0 | 7.0 | 7.0 |
| Ratio D1/D | 0.8 | 0.8 | 0.8 | 0.8 | 0.8 | 0.8 |
| Ratio H/D | 0.5 | 0.5 | 0.5 | 0.5 | 0.5 | 0.5 |
| Ratio H/D1 | 0.63 | 0.63 | 0.63 | 0.63 | 0.63 | 0.63 |
| Ratio Po/Pi | 0.97 | 0.95 | 0.95 | 0.95 | 0.97 | 0.97 |
| Step wear | 2 | 3 | 4 | 5 | 5 | 5 |
| Shoulder wear | 5 | 4 | 5 | 5 | 5 | 5 |
| Splitting of side end | G | G | G | G | G | NG |

TABLE 6

Evaluation results

|  | Example 18 | Example 19 | Comp. example 15 | Comp. example 16 | Example 20 | Comp. example 17 |
| --- | --- | --- | --- | --- | --- | --- |
| Ratio BW/TW | 0.98 | 0.98 | 0.98 | 0.98 | 0.98 | 0.98 |
| Side end | A | A | A | A | A | A |
| Width GW of side groove [mm] | 2.0 | 8.0 | 2.0 | 9.0 | 2.0 | 1.0 |
| Width RW of side end [mm] | 8.0 | 2.0 | 9.0 | 2.0 | 2.0 | 1.0 |
| Sum (GW + RW) [mm] | 10.0 | 10.0 | 11.0 | 11.0 | 4.0 | 2.0 |
| Ratio D1/D | 0.8 | 0.8 | 0.8 | 0.8 | 0.8 | 0.8 |
| Ratio H/D | 0.5 | 0.5 | 0.5 | 0.5 | 0.5 | 0.5 |
| Ratio H/D1 | 0.63 | 0.63 | 0.63 | 0.63 | 0.63 | 0.63 |
| Ratio Po/Pi | 0.95 | 0.95 | 0.95 | 0.95 | 0.95 | 0.95 |
| Step wear | 4 | 5 | 4 | 5 | 4 | 2 |
| Shoulder wear | 5 | 5 | 5 | 5 | 5 | 5 |
| Splitting of side end | G | G | G | G | G | NG |

As indicated in table 1 to table 6, the evaluations for the tires of examples are higher than those for the tires of comparative examples. The evaluation results clearly indicate that the present invention is superior. In comparative example 4, since the ends of the belt were not located at appropriate positions, the tire of comparative example 4 was inferior in durability to the tires of examples. In comparative example 7, since the ends of the belt were close to the bottom of each side groove, the tire of comparative example 7 was inferior in durability to the tires of examples. In comparative example 15 and 16, since the body of the tread was easily worn, the tires of comparative example 15 and 16 were inferior in durability to the tires of examples.

The tire as described above is applicable to various vehicles such as trucks and buses. These are merely examples.

The foregoing description is in all aspects illustrative, and various modifications can be devised without departing from the essential features of the invention.

What is claimed is:

1. A heavy duty pneumatic tire comprising:
a tread formed of a crosslinked rubber; and
a belt that is located inwardly of the tread in a radial direction, and that extends in an axial direction, wherein
a body having an outer surface that forms a tread surface, and side ends located outwardly of the body in the axial direction are formed by side grooves extending in a circumferential direction being formed in end portions of the tread,
shoulder portions are formed in end portions of the body by main grooves extending in the circumferential direction being formed in the body,
a vertex of each side end is located inwardly of the tread surface in the radial direction,
a ratio of a width BW of the belt to a width TW of the body is greater than or equal to 0.95, and is not greater than 1.00,
a width GW of each side groove is greater than or equal to 2.0 mm,
a width RW of each side end is greater than or equal to 2.0 mm,
a sum of the width GW of each side groove and the width RW of each side end is less than or equal to 10 mm,
a ratio of a depth D1 of each side groove to a depth D of each main groove is greater than or equal to 0.6, and is not greater than 1.0,
a ratio of a distance H from the vertex of each side end to the tread surface relative to the depth D of each main groove is greater than or equal to 0.4, and
when a ground contact surface of each shoulder portion, which is obtained when the tire contacts with a ground, is divided into an outer ground contact surface and an inner ground contact surface located inwardly of the outer ground contact surface in the axial direction, by a virtual boundary that extends in the circumferential direction, and that passes through a center of a maximal width of the ground contact surface, a ratio of an average ground contact pressure Po of the outer ground contact surface relative to an average ground contact pressure Pi of the inner ground contact surface is greater than or equal to 0.90, and is not greater than 1.00, wherein the vertex of each side end is an edge of each side end, which is located on the innermost side of the side end in the axial direct ion, wherein the outer surface of each side end extends outward from the edge of each side end in the axial direction so as to be tilted inward in the radial direction.

2. The heavy duty pneumatic tire according to claim 1, wherein a ratio of the distance H to the depth D1 is greater than or equal to 0.4, and is not greater than 0.9.

* * * * *